(12) United States Patent
Donahue

(10) Patent No.: US 9,863,633 B2
(45) Date of Patent: Jan. 9, 2018

(54) OXYGEN AND NITROGEN ENRICHMENT OF ATMOSPHERIC AIR USING AN IMPELLER-BASED APPARATUS

(71) Applicant: Leonard Lawrence Donahue, Stratford, CT (US)

(72) Inventor: Leonard Lawrence Donahue, Stratford, CT (US)

( * ) Notice: Subject to any disclaimer, the term of this patent is extended or adjusted under 35 U.S.C. 154(b) by 0 days.

(21) Appl. No.: 15/431,224

(22) Filed: Feb. 13, 2017

(65) Prior Publication Data

US 2017/0234534 A1 Aug. 17, 2017

Related U.S. Application Data

(60) Provisional application No. 62/295,640, filed on Feb. 16, 2016.

(51) Int. Cl.
  *F01N 3/00* (2006.01)
  *F23L 7/00* (2006.01)
  (Continued)

(52) U.S. Cl.
  CPC .............. *F23L 7/007* (2013.01); *B01D 53/24* (2013.01); *B01D 53/30* (2013.01); *F01N 11/00* (2013.01)

(58) Field of Classification Search
  CPC ......... B01D 53/24; B01D 53/30; F01N 11/00; F23L 7/007; F04D 19/002
  (Continued)

(56) References Cited

U.S. PATENT DOCUMENTS 1,339,211 A 5/1920 McKernan
3,817,232 A 6/1974 Nakajima et al.
(Continued)

FOREIGN PATENT DOCUMENTS

EP 1716324 B1 5/2013
EP 2954943 A1 12/2015
EP 2853306 B1 3/2016

OTHER PUBLICATIONS

V. Balepin et al, "Progress in Air Separation with the Vortex Tubes", AIAA-99-4844, 1999 (9th International Space Planes and Hypersonic Systems and Technologies Conference, Norfolk, VA).
(Continued)

*Primary Examiner* — Phutthiwat Wongwian
*Assistant Examiner* — Diem Tran
(74) *Attorney, Agent, or Firm* — Anatoly Frenkel

(57) ABSTRACT

The specification and drawings present a new apparatus and method for continuously providing oxygen-enriched gas/air produced from a predefined atmospheric air (normally comprising 78% of nitrogen $N_2$ and 21% of oxygen $O_2$) to a combustion area/chamber, using an impeller-based apparatus having a duct system. The impeller system can comprise at least one plurality of gates for capturing the oxygen-enriched gas/air to automatically improve processes of combustion, exhaust and/or related properties of the apparatus. The impeller can comprise a plurality of blades which, when rotating/spinning, may create the desired gas density/mass separation of oxygen and nitrogen. Furthermore, a nitrogen-enriched gas/air can be further provided from a predefined atmospheric air using the impeller-based apparatus with at least one plurality of further gates system/duct, gates rotating in sync with impeller blades, for collecting the nitrogen-enriched gas/air to further improve one or more apparatus parameters.

23 Claims, 11 Drawing Sheets

(51) Int. Cl.
  *F01N 11/00* (2006.01)
  *B01D 53/24* (2006.01)
  *B01D 53/30* (2006.01)

(58) Field of Classification Search
  USPC .......................... 60/276, 285; 415/185, 186
  See application file for complete search history.

(56) References Cited

U.S. PATENT DOCUMENTS

| | | | |
|---|---|---|---|
| 4,351,302 A | 9/1982 | Brettler | |
| 5,051,113 A | 9/1991 | Nemser | |
| 5,051,114 A | 9/1991 | Nemser et al. | |
| 5,400,746 A | 3/1995 | Susa | |
| 5,526,641 A | 6/1996 | Sekar et al. | |
| 5,553,591 A | 9/1996 | Yi | |
| 5,640,845 A | 1/1997 | Ng et al. | |
| 5,636,619 A | 6/1997 | Poola et al. | |
| 5,649,517 A | 7/1997 | Poola et al. | |
| 5,678,526 A | 10/1997 | Cullen | |
| 5,779,770 A | 7/1998 | Nitta | |
| 6,543,428 B1 | 4/2003 | Blandino et al. | |
| 7,806,966 B2 * | 10/2010 | Bose | B01D 53/24 55/385.3 |
| 8,623,118 B2 * | 1/2014 | Belanger | B01D 53/0476 95/130 |
| 9,254,493 B2 | 2/2016 | Inoue et al. | |
| 9,375,546 B2 | 6/2016 | Ruff | |
| 2003/0015185 A1 | 1/2003 | Dutart | |
| 2017/0021302 A1 | 1/2017 | Galabraith et al. | |

OTHER PUBLICATIONS

Jun Cai et al, Oxygen enrichment from Air using the Interception Effect of Gradient Magnetic Field on Oxygen Molecules:, Physics Letters A 362, pp. 105-108, 2007.

A. R. Smith and J. Klosek, "A review of Air Separation and their Integration with Energy Conversion Processes", Fuel Processing Technology 70, pp. 115-134, 2001.

* cited by examiner

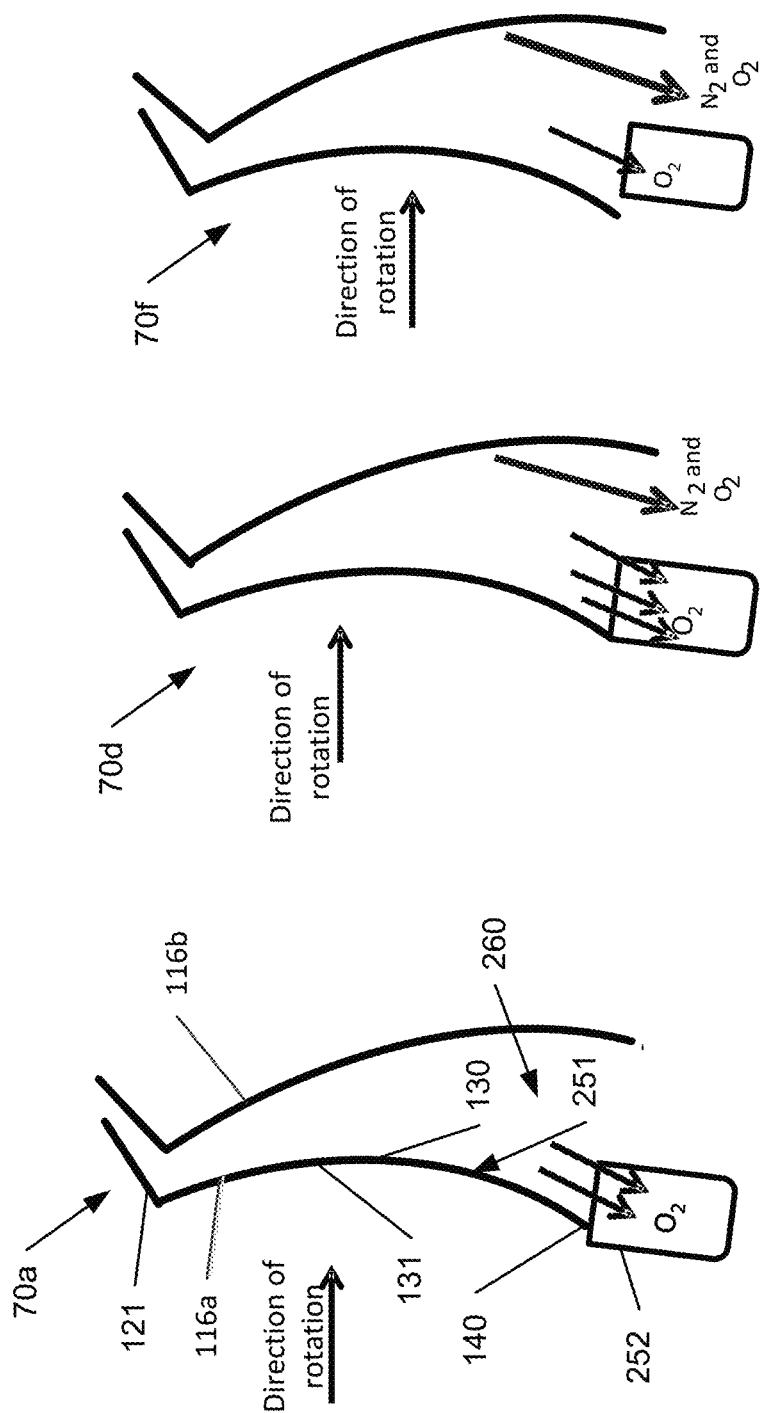

OXYGEN AND NITROGEN ENRICHMENT OF ATMOSPHERIC AIR USING AN IMPELLER-BASED APPARATUS

CROSS-REFERENCE TO RELATED APPLICATIONS

This non-provisional U.S. patent application claims the benefit of the filing date under 35 USC 119(e) of U.S. provisional patent application No. 62/295,640 filed on Feb. 16, 2016, the teachings of which are incorporated herein by reference in their entirety.

TECHNICAL FIELD

The invention generally relates to fossil-fueled combustion devices/systems. More particularly but not exclusively, this invention relates to continuously providing, using a predefined atmospheric air, oxygen-enriched gas/air as well as nitrogen-enriched gas/air using an impeller-based apparatus for improving combustion, exhaust and related properties of the apparatus.

BACKGROUND OF THE INVENTION

It was recognized for many decades that using oxygen-enriched air in fossil-fueled combustion engines can lead to significant benefits, such as increasing in power output, improving fuel consumption (conversion efficiency) and thermal conversion efficiency, and reducing exhaust emissions of carbon monoxide and hydrocarbons. It was further demonstrated that introducing nitrogen-enriched air in the combustion process and/or exhaust circulation system can be useful for decreasing particulates, such as hydrocarbons, and gases like CO and $NO_X$, in exhaust emissions of internal combustion engines.

Substantial efforts have been aimed at improving engine efficiencies and decreasing emissions that pollute the environment, using, for example, permeable membranes, to provide the oxygen-enriched and/or nitrogen-enriched air. Notwithstanding the advantages of introducing the oxygen-enriched air and/or nitrogen-enriched air in various fossil-fueled combustion devices/systems, the lack of an economical source of on-line oxygen and nitrogen has made it difficult to provide a practical application of the concept of providing the oxygen-enriched air and/or nitrogen-enriched air to corresponding engines/systems, at least during various phases or time periods of operation of the engine.

SUMMARY OF THE INVENTION

According to a first aspect of the invention, an apparatus, comprising: a housing, comprising one or more entry ports for inletting a predefined atmospheric air comprising gases of oxygen (O2) and nitrogen (N2), the housing further comprising: an impeller comprising a plurality of blades of a predetermined shape around an impeller axis, each blade (or each impeller blade) being extended from the impeller axis to a distal end on a perimeter of the impeller, the impeller being configured, when blades are spinning, to pull the predefined atmospheric air inside the housing through the one or more entry ports, and create a gas gradient to concentrate an oxygen-enriched gas/air of the predefined atmospheric air near at least one surface of each blade of the plurality of blades, the one surface pushing the pulled predefined atmospheric air; and a plurality of gates placed around the impeller at the distal ends of the corresponding blades of the plurality of blades to collect the oxygen-enriched gas/air, the plurality of gates being rotated synchronously with the impeller blades around the impeller axis, the oxygen-enriched gas/air being provided to a combustion chamber of the apparatus for optimizing a combustion process.

According further to the first aspect of the invention, the apparatus can comprise a vehicle driven by an engine comprising the combustion chamber or one or more combustion chambers/spaces. Further, the apparatus can comprise a fossil-fuel burning vehicle containing an automobile, a motorcycle, a truck, an aircraft, a ship, a bus or a rocket or the like, or the apparatus can comprise a fossil-fuel burning apparatus containing a power generator, a power plant, a heater or a furnace.

Still further according to the first aspect of the invention, the pushing surfaces of the plurality of blades can comprise a plurality of surface nodes implemented as bumps or dips to increase the portion of oxygen near the pushing surfaces. Further, the corresponding blades of the plurality of blades can comprise holes at least on the pushing surface and on the distal end of the blade to increase collection efficiency of oxygen in the collected oxygen-enriched gas.

According further to the first aspect of the invention, the apparatus may further comprise an engine comprising the combustion chamber and one or more exhaust sensors analyzing a composition of an exhaust gas from the combustion chamber for providing a feedback signal for fine tuning of the oxygen-enriched gas/air entering the plurality of gates in order to meet exhaust standards; the fine tuning can be provided by one or more of: a) varying a rotation velocity of the pluralities of blades and gates, and b) a corresponding small shift of each of the plurality of gates relative to a distal end of the corresponding blades of the plurality of blades while synchronously rotated. Still further, the one or more exhaust sensors may comprise one or more of: a temperature sensor, a particulate sensor, a carbon oxide sensor, a carbon dioxide sensor, an oxygen sensor, a water sensor, a carbon monoxide sensor, and a nitrogen oxide sensor.

According still further to the first aspect of the invention, the apparatus can further comprise: a plurality of further gates placed around the impeller to collect the nitrogen-enriched gas/air, each of the further gates is located between two adjacent blades, the pluralities of gates and further gates being rotated synchronously with the impeller blades around the impeller axis. Further, the nitrogen-enriched gas/air can be used in the apparatus for cooling of an engine or transmission of the apparatus, for reducing explosivity of a fuel tank, or for improving combustion or exhaust performance. Still further, the apparatus can further comprise nitrogen content and/or temperature sensor(s) for analyzing nitrogen content and/or temperature of the nitrogen-enriched gas/air provided to facilitate one or both, the desired nitrogen content tuning and a desired temperature tuning, which can be provided by one or more of: a) varying a rotation velocity of the pluralities of blades and gates, and b) a corresponding small shift of each of the plurality of further gates relative to the corresponding two adjacent blades.

According yet further still to the first aspect of the invention, the apparatus can further comprise an oxygen content sensor for analyzing oxygen content of the oxygen-enriched gas/air provided by the plurality of gates to provide preliminary tuning of a desired portion of oxygen in the oxygen-enriched gas/air, where the preliminary tuning can be provided by one or more of: a) varying a rotation velocity of the pluralities of blades and gates, and b) a corresponding small shift of each of the plurality of gates relative to the distal end of the corresponding blades of the plurality of blades while synchronously rotated.

Yet still further according to the first aspect of the invention, the plurality of blades may comprise an uneven number of blades for harmonic resonance prevention and control.

According to a second aspect of the invention, a method, comprising: spinning a plurality of blades having a predetermined shape of impeller around an impeller axis of an apparatus and pulling a predefined atmospheric air comprising gases of oxygen ($O_2$) and nitrogen ($N_2$), each blade being extended from the impeller axis to a distal end on a perimeter of the impeller, to create a gas gradient to concentrate an oxygen-enriched gas/air of the predefined atmospheric air near at least one surface of each blade of the plurality of blades, the one surface pushing the pulled predefined atmospheric air; and further spinning a plurality of gates placed around the impeller at the distal ends of corresponding blades of the plurality of blades for collecting the oxygen-enriched gas/air, the plurality of gates being rotated synchronously with the impeller blades around the impeller axis; and providing the collected oxygen-enriched gas/air to a combustion chamber of the apparatus for optimizing a combustion process.

According further to the second aspect of the invention, the spinning and the further spinning may start when the apparatus falls below or exceed a threshold speed.

Further according to the second aspect of the invention, the method may further comprises: determining whether the exhaust gas of the combustion process is in compliance with exhaust standards, using a plurality of one or more exhaust sensors analyzing a composition of the exhaust gas; and providing a feedback signal for fine tuning of the oxygen enriched gas/air entering the plurality of gates in order to meet the exhaust standards, where the fine tuning can be provided by one or more of: a) varying a rotation velocity of the pluralities of blades and gates, and b) a corresponding small shift of each of the plurality of gates relative to the a distal end of corresponding blades of the plurality of blades while synchronously rotated.

Still further according to the second aspect of the invention, before providing the collected oxygen-enriched gas/air to a combustion chamber of the apparatus for a combustion process, the method may further comprise: determining whether the collected oxygen-enriched gas/air has the desired portion of oxygen, using at least one oxygen-content gas sensor; and providing a feedback signal for preliminary tuning of a desired portion of oxygen in the oxygen-enriched gas/air, the preliminary tuning can be provided by one or more of: a) varying a rotation velocity of the pluralities of blades and gates, and b) a corresponding small shift of each of the plurality of gates relative to the distal end of the corresponding blades of the plurality of blades while synchronously rotated. Moreover, the method may further comprise: further spinning a plurality of further gates placed around the impeller to collect the nitrogen-enriched gas/air, each of the further gated being located between two adjacent blades, the pluralities of further gates being rotated synchronously with the impeller blades around the impeller axis. Furthermore, the method may further comprise: using the nitrogen-enriched gas/air in the apparatus for cooling of an engine of the apparatus, for reducing explosivity of a fuel tank, or for improving combustion or exhaust performance. Still further, the method may further comprise: determining whether the collected nitrogen-enriched gas/air has one or both a desired portion of nitrogen and a desired temperature, using one or more nitrogen/temperature sensor; and providing a feedback signal for nitrogen tuning to facilitate one or both the desired portion of nitrogen and the desired temperature in the nitrogen-enriched gas/air, by one or more: a) varying a rotation velocity of the pluralities of blades and gates, and b) a corresponding small shift of each of the plurality of further gates relative to the corresponding two adjacent blades.

According to a third aspect of the invention, a non-transitory computer readable storage medium tangibly storing computer program instructions capable of being executed by a computer processor, the computer program instructions defining code for: spinning a plurality of blades having a predetermined shape of impeller around an impeller axis of an apparatus and pulling predefined atmospheric air comprising gases of oxygen (O2) and nitrogen (N2), each blade being extended from the impeller axis to a distal end on a perimeter of the impeller, to create a gas gradient to concentrate an oxygen-enriched gas/air of the predefined atmospheric air near at least one surface of each blade of the plurality of blades, the one surface pushing the pulled predefined atmospheric air; further spinning a plurality of gates placed around the impeller at the distal ends of corresponding blades of the plurality of blades for collecting the oxygen-enriched gas/air, the plurality of gates being rotated synchronously with the impeller blades around the impeller axis; and providing the collected oxygen-enriched gas/air to a combustion chamber of the apparatus for optimizing a combustion process.

Further according to the third aspect of the invention, the computer program instructions may further define code for: determining whether the exhaust gas of the combustion process is in compliance with exhaust standards using a plurality of one or more exhaust sensors analyzing a composition of the exhaust gas; and providing a feedback signal for fine tuning of the oxygen-enriched gas/air entering the plurality of gates in order to meet the exhaust standards, where the fine tuning is provided by one or more of: a) varying a rotation velocity of the pluralities of blades and gates, and b) a corresponding small shift of each of the plurality of gates relative to a the distal end of the corresponding blades of the plurality of blades while synchronously rotated.

Still further according to the third aspect of the invention, the computer program instructions may further define code for: determining whether the collected oxygen-enriched gas/air has a desired portion of oxygen, using at least one oxygen-content gas sensor; and providing a feedback signal for preliminary tuning of the desired portion of oxygen in the oxygen-enriched gas/air, the preliminary tuning being provided by one or more of: a) varying a rotation velocity of the pluralities of blades and gates, and b) a corresponding small shift of each of the plurality of gates relative to the distal end of the corresponding blades of the plurality of blades while synchronously rotated.

BRIEF DESCRIPTION OF THE DRAWINGS

These and other features and aspects of the present disclosure will become better understood when the following detailed description is read, with reference to the accompanying drawings, in which like characters represent like parts throughout the drawings, wherein.

Figure 2:
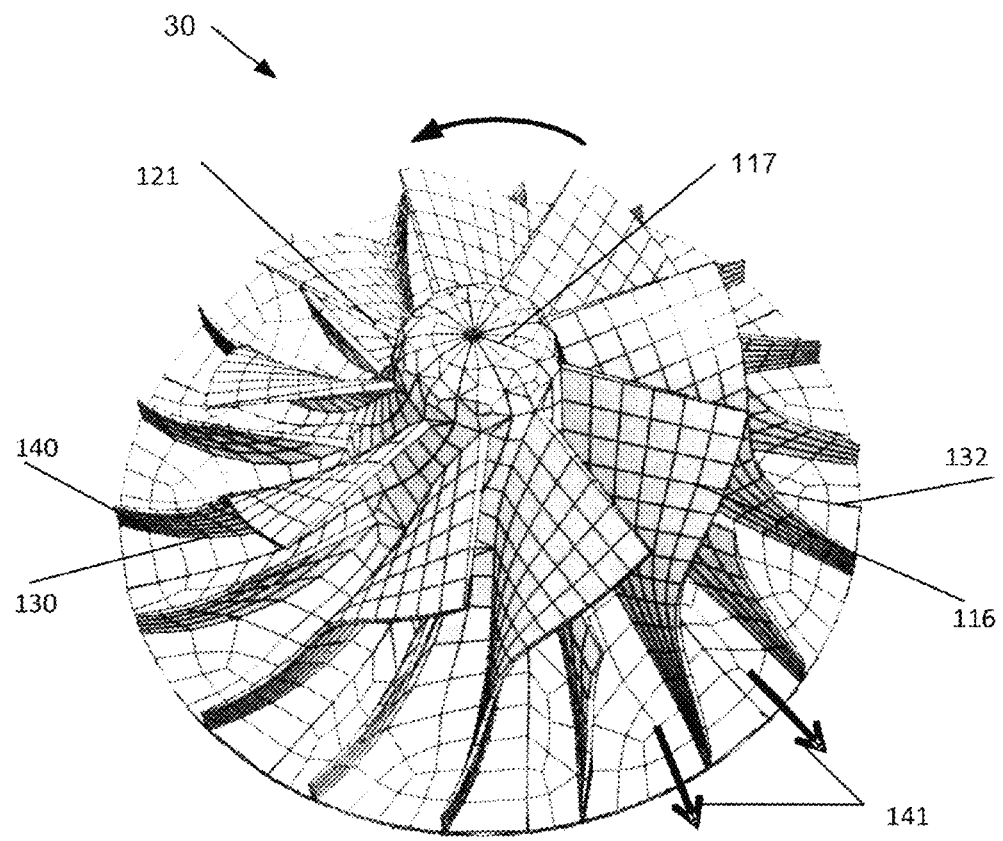
Figure 3:
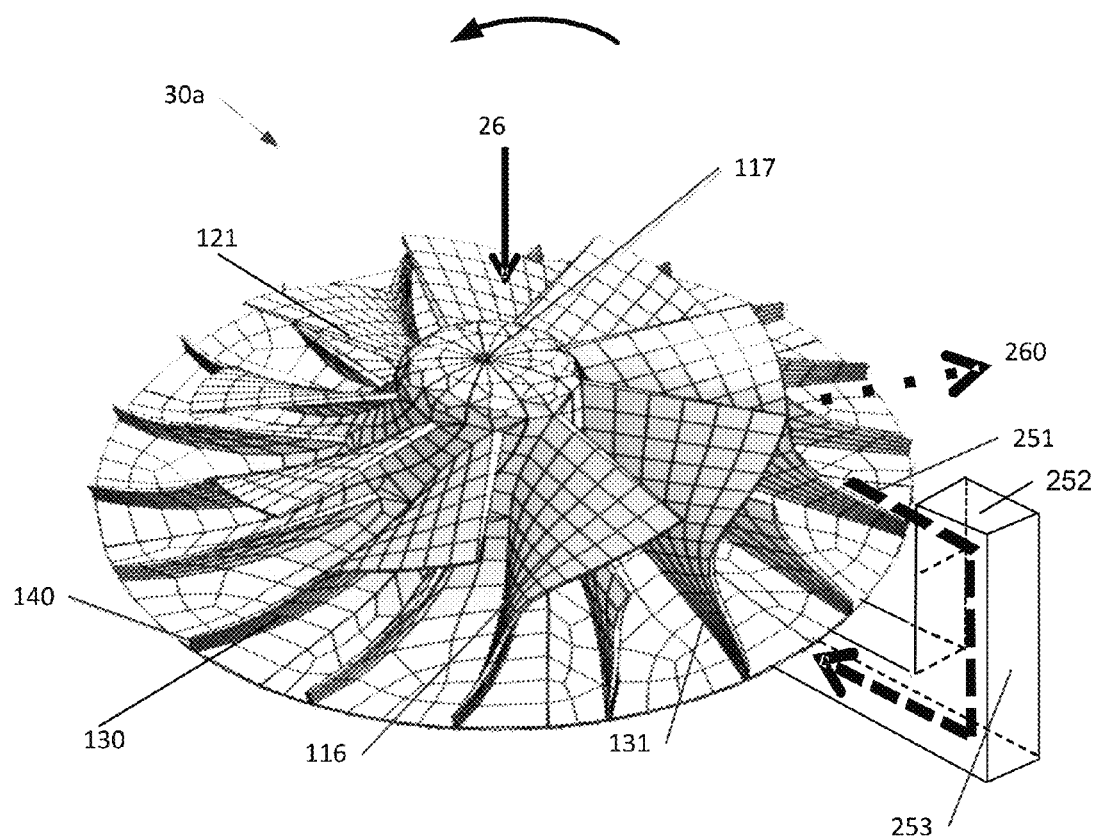
Figure 4:
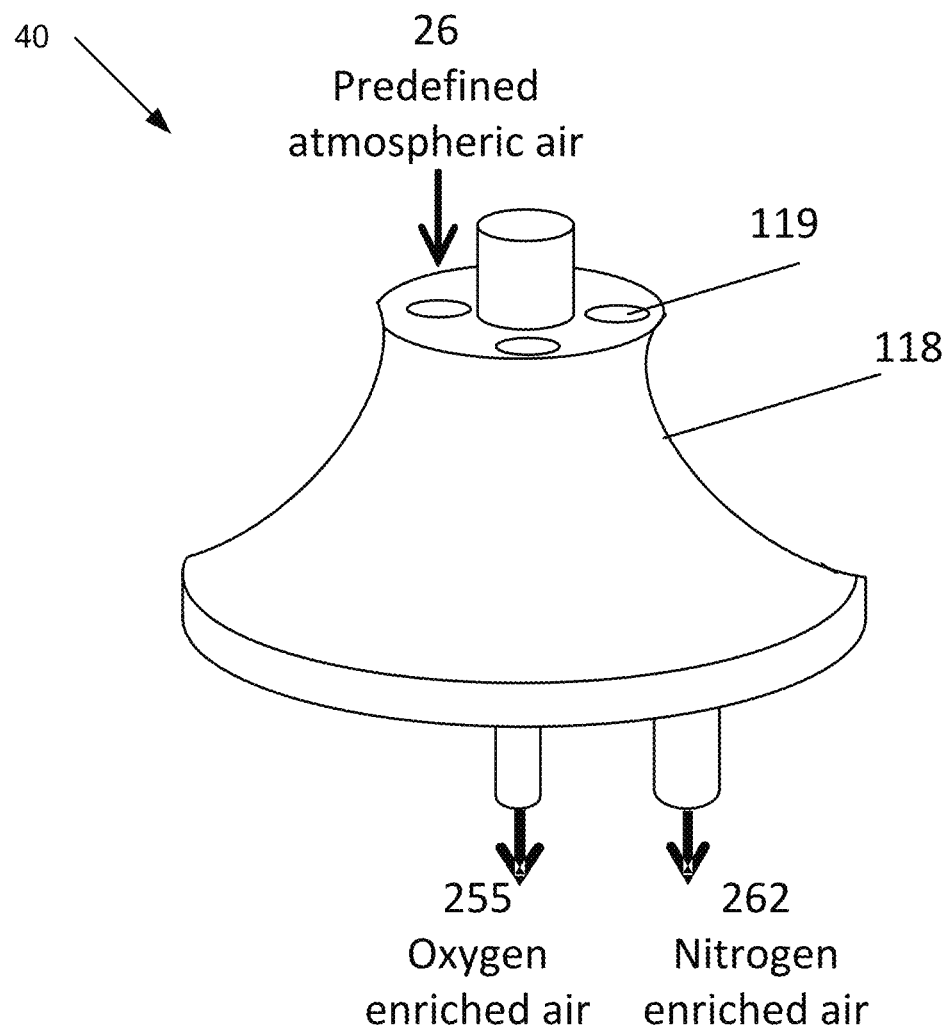
Figure 5:
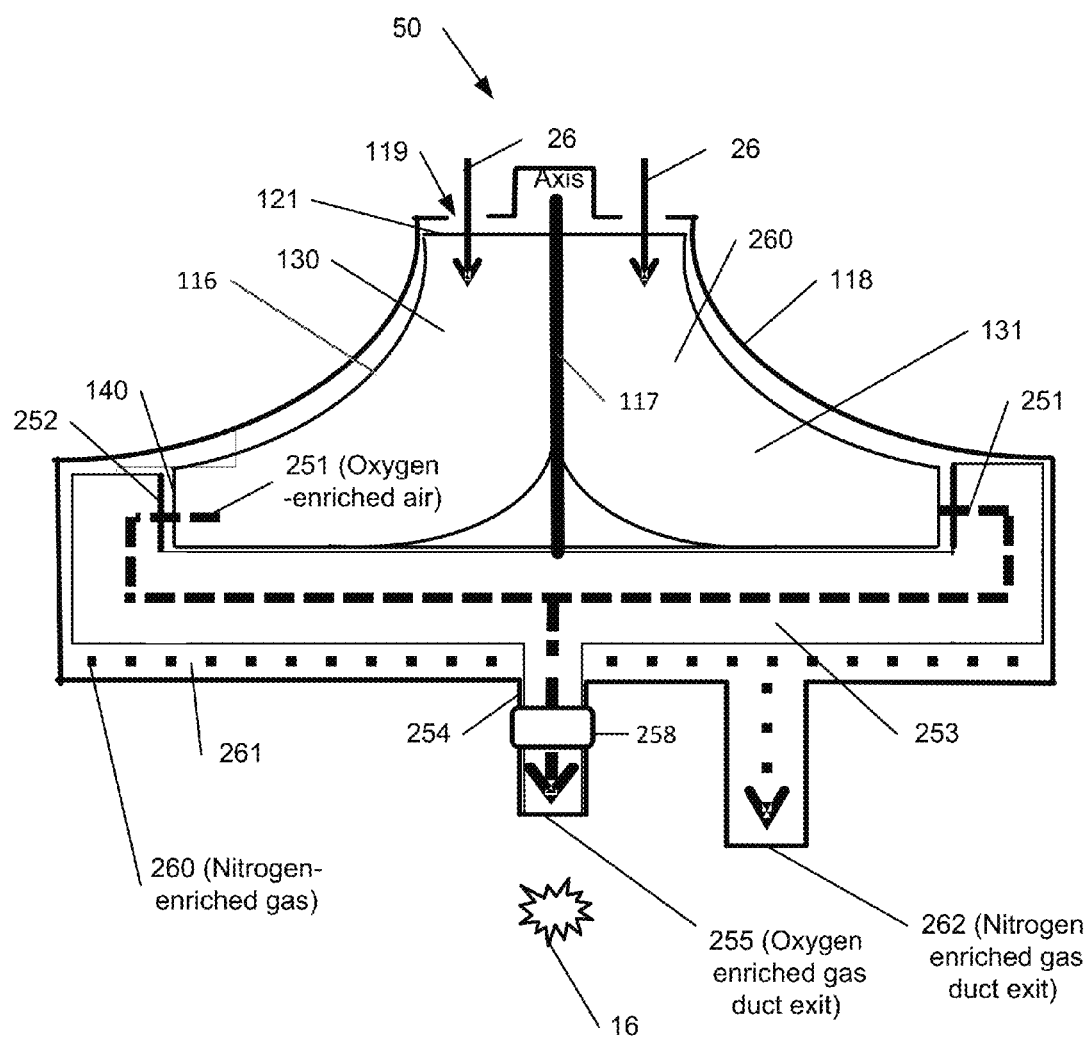
Figure 6:
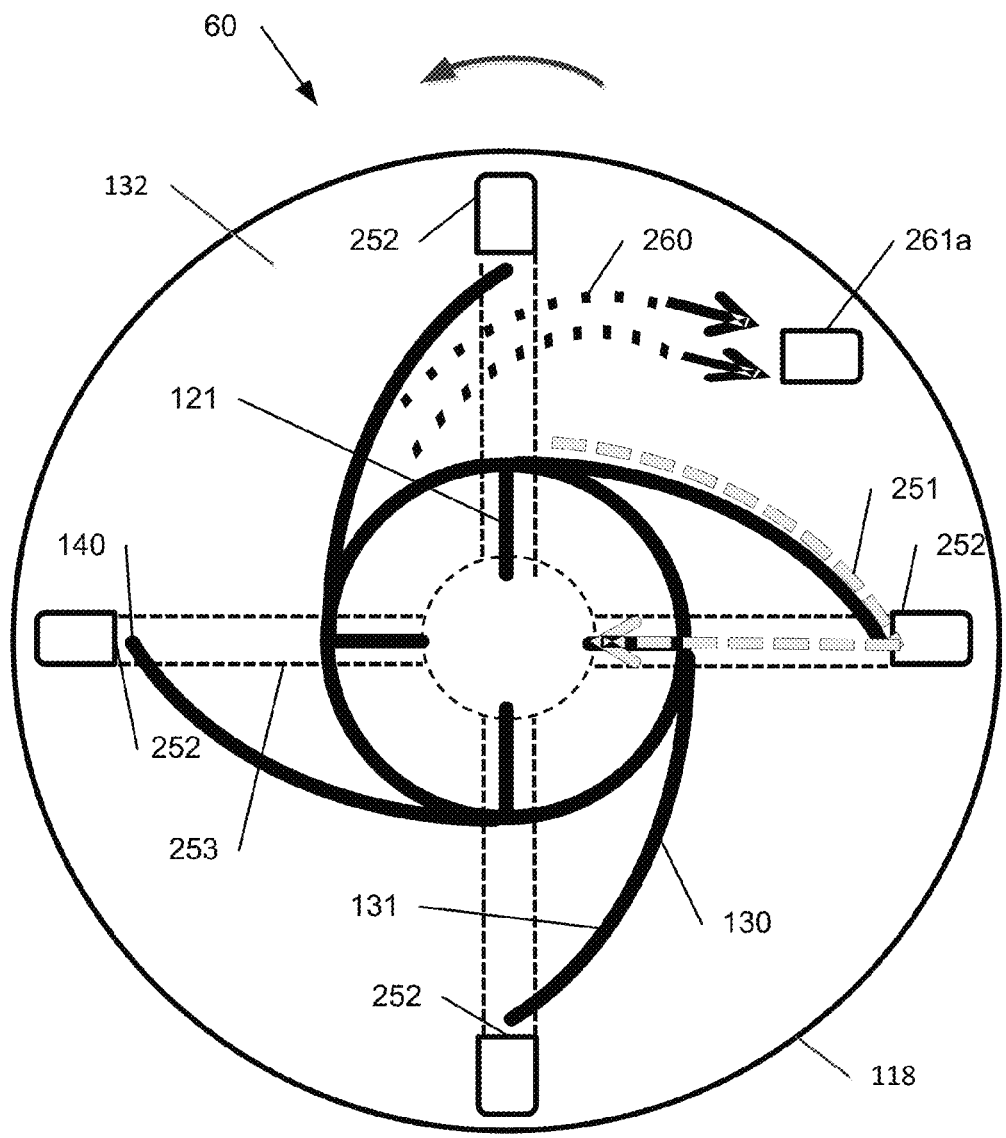
Figure 8B:
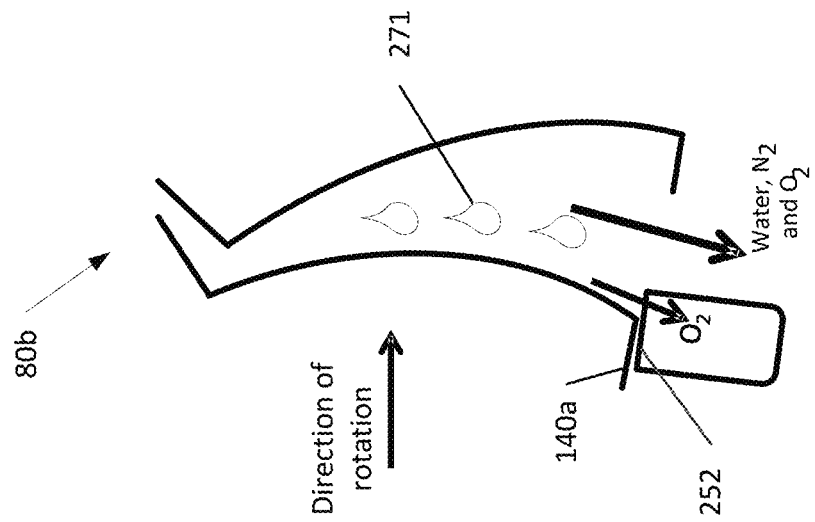
Figure 8A:
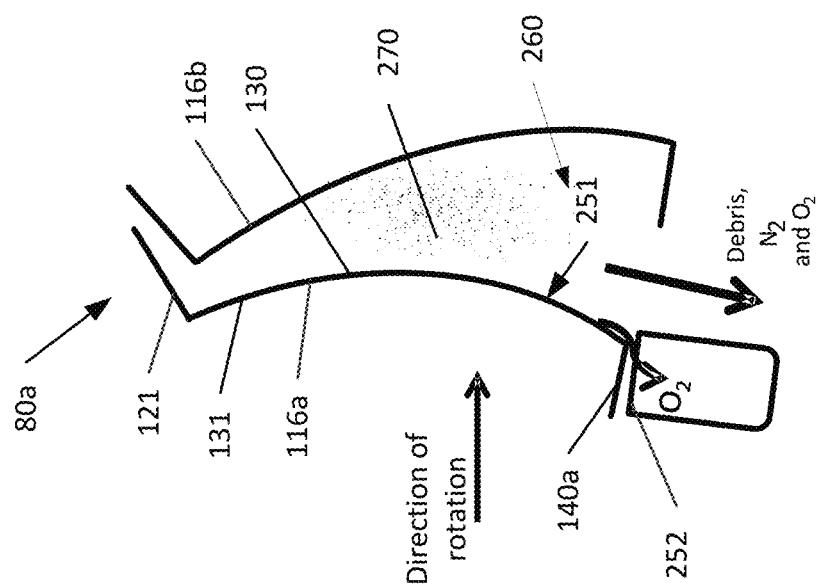
Figure 9A:
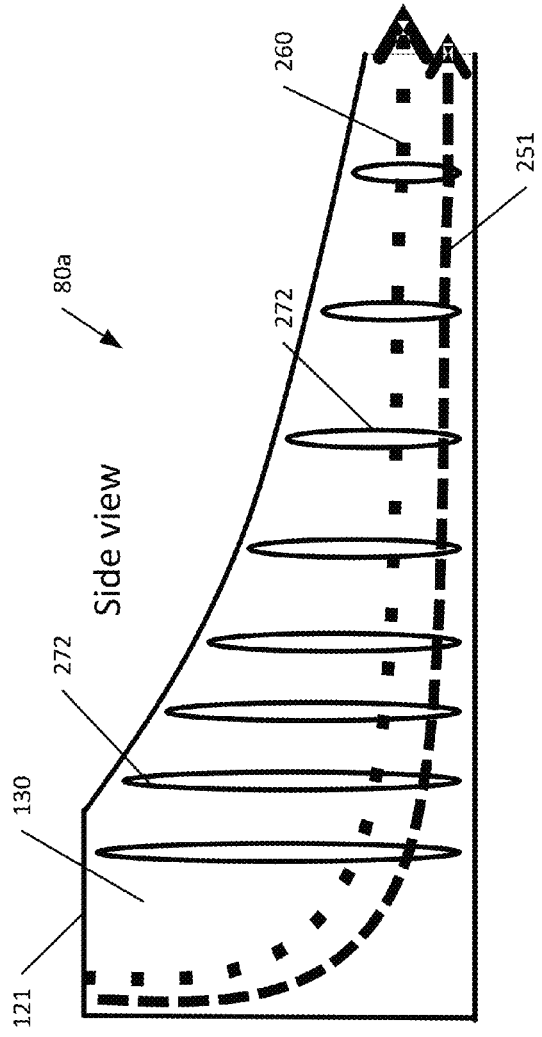
Figure 9B:
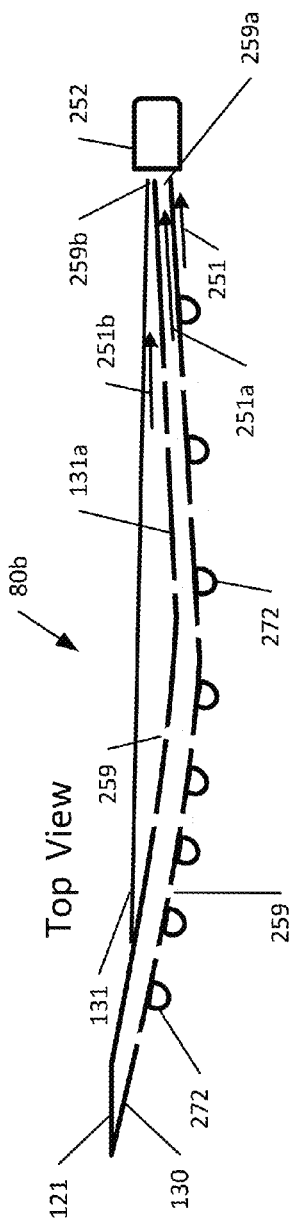
Figure 10:
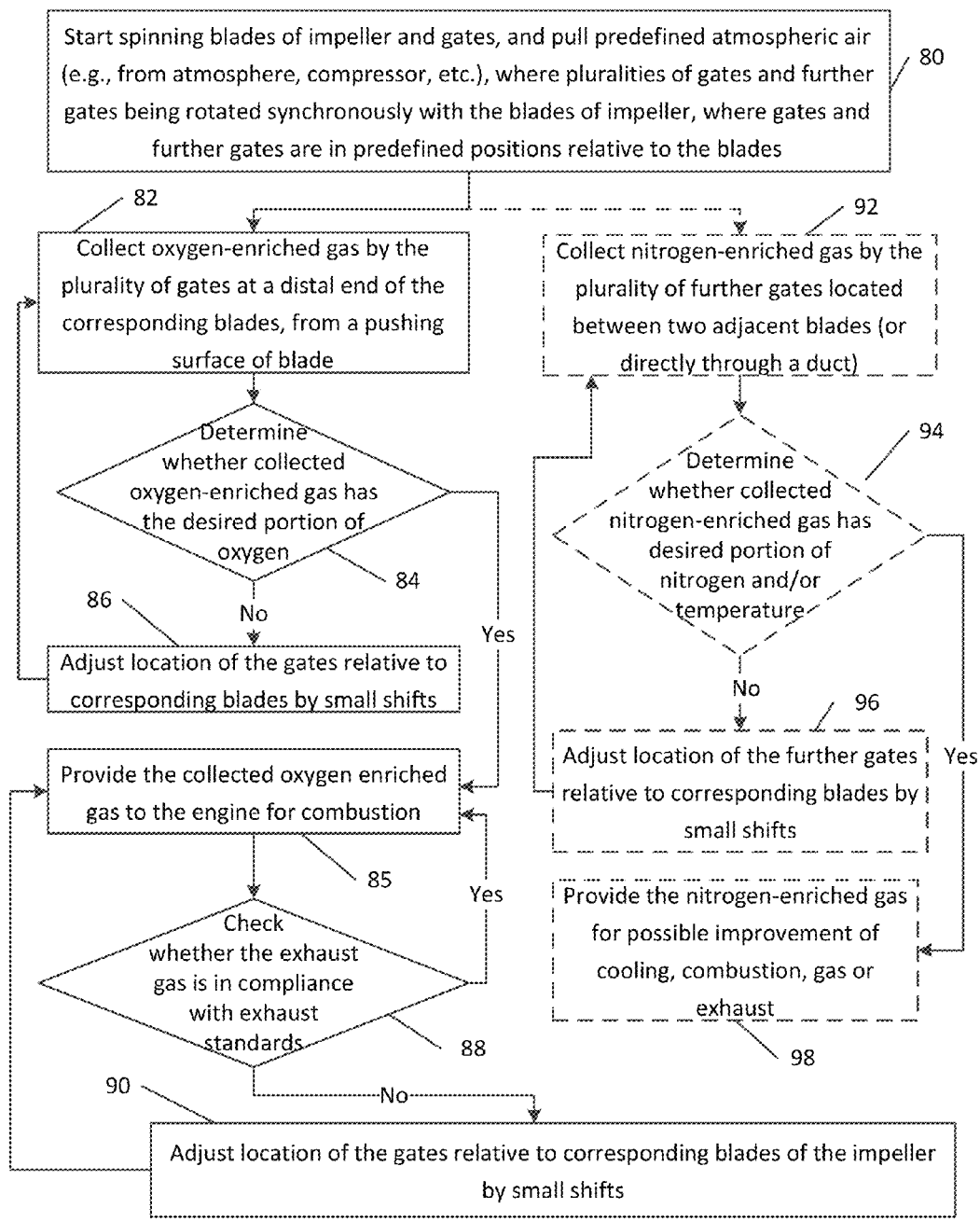
Figure 11:
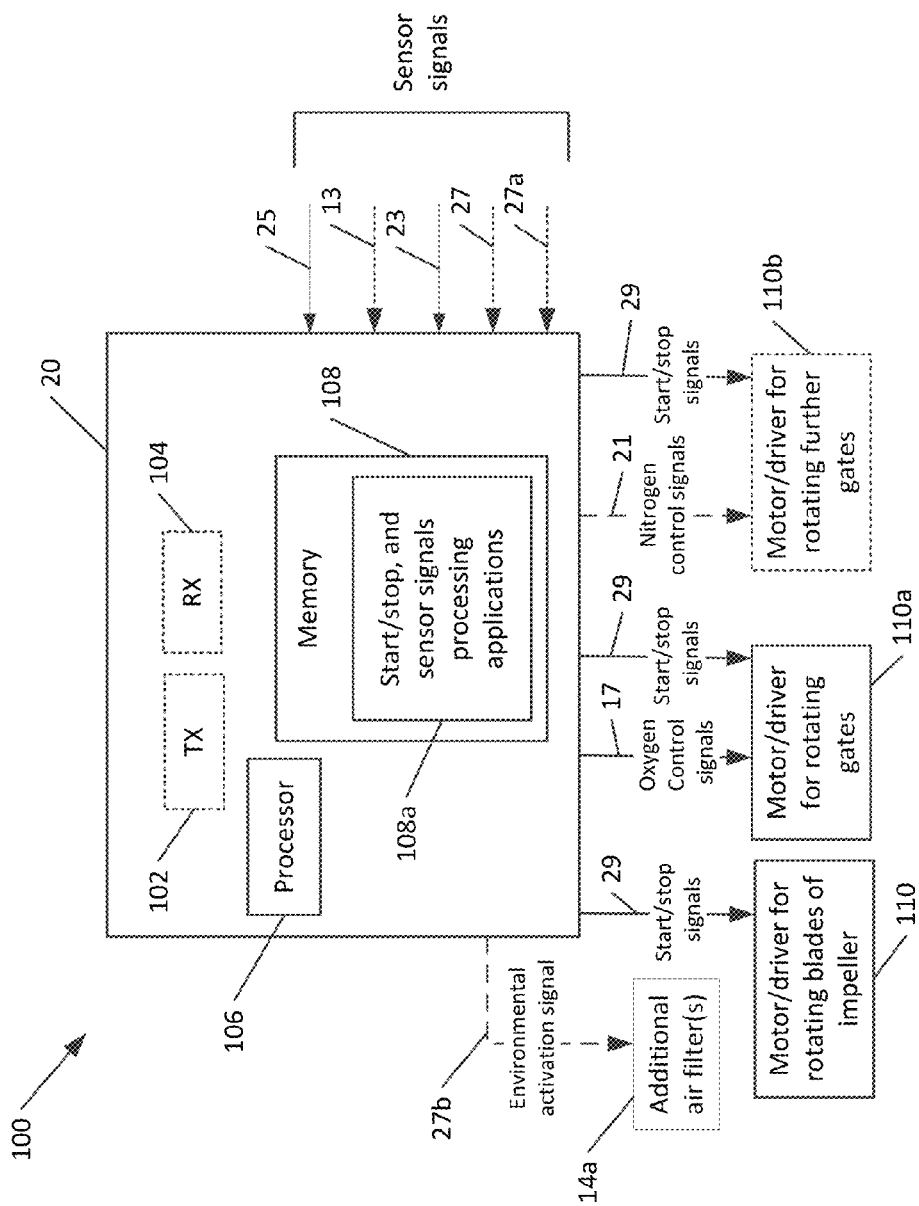

FIG. 2 is an exemplary view of an impeller for compressing gases, which is typically used in various devices such as compressors, turbo chargers, super chargers, and the like;

FIG. 3 is an exemplary three-dimensional view of an impeller system with added/identified gates for capturing the oxygen-enriched and nitrogen-enriched gases, according to an embodiment of the invention;

FIG. 4 is an exemplary three-dimensional view of a housing comprising/enclosing an impeller system and a gate system for collecting oxygen-enriched and nitrogen-enriches gases, according to various embodiments of the invention;

FIG. 5 is an exemplary cross-sectional view of a housing assembly, according to an embodiment of the invention;

FIG. 6 is an exemplary top cross-sectional view of a housing assembly with a removed (virtually cut) housing top portion, according to an embodiment of the invention;

FIGS. 7A-7C are exemplary top views of various gate positions under different conditions, where the gate collects oxygen-enriched gas, according to an embodiment of the invention;

FIGS. 8A-8B are exemplary top views of various gate positions under different environmental conditions, where the gate collects oxygen-enriched gas, according to an embodiment of the invention;

FIGS. 9A-9B are exemplary side and top views respectively of an impeller blade with approximated surface nodes on the driven/pushing surface of the blades, according to an embodiment of the invention;

FIG. 10 is an exemplary flowchart for implementation of various embodiments of the invention; and FIG. 11 is an exemplary block diagram of a computer/controller (shown in FIG. 1) demonstrating its operation within apparatus, according to various embodiments of the invention.

DETAILED DESCRIPTION

New apparatus and method are presented for continuously providing an oxygen-enriched gas/air generated/produced from a predefined atmospheric air (normally atmospheric air comprises 78% of nitrogen $N_2$ and 21% of oxygen $O_2$) to a combustion area/chamber, using an impeller-based apparatus having a duct system and comprising at least one plurality of gates for capturing the oxygen-enriched gas/air to automatically improve combustion, exhaust and/or related properties of the apparatus. The impeller comprises a plurality of blades which, when rotating/spinning, can create the desired gas density/mass separation of oxygen and nitrogen. Optimally, the plurality of blades can comprise an uneven number of blades for preventing/controlling harmonic resonance destruction effects. Moreover, the blades of the plurality of blades may be identical or non-identical based on applications and design requirements.

According to a further embodiment of the invention, a nitrogen-enriched (oxygen-depleted) gas/air can be further provided from a predefined atmospheric air using the impeller-based apparatus comprising at least one plurality of further gates system/duct, gates rotating in sync with impeller blades, for collecting the nitrogen-enriched gas/air. The collected nitrogen-enriched gas/air, which may be cooler than the predefined atmospheric air, can be channeled as desired and used for automatically improving one or more apparatus parameters such as a) cooling of an engine, transmission and other parts of the apparatus; b) providing better safety of a fuel tank by providing a less combustible space, and/or c) improving combustion or exhaust performance. An additional duct for removing extra air (e.g., using a pressure relief valve) within the housing encompassing the impeller blades, gates and further gates (e.g., the housing like one shown in FIG. 4) may be further used to avoid undesirable excess gas pressure within the housing.

It is noted that according to another embodiment, the nitrogen-enriched gas may be collected directly to a duct without using the plurality of further gates, but with less capability to adjust parameters like nitrogen content, temperature of the gas and others, as further described herein.

According to various embodiments of the invention, the predefined atmospheric air may be pulled naturally from the atmosphere, may be provided through an opening in a device or a moving body/vehicle, it can be pressurized atmospheric air provided by another impeller or by other fan-driven device such as a compressor, a supercharger, a turbocharger or the like.

Continually providing oxygen-enriched gas/air may enable fossil fuels to burn more rapidly and completely, producing more power and lower emissions. This can have a widespread impact to a wide variety of industries, including (but not limited to) transportation, power production, defense, agriculture, construction, manufacturing, and heating. The potential applications may include various devices driven by combustion engines such as devices comprising combustion chambers or one or more combustion spaces. These devices may comprise fossil-fuel burning vehicles which can include automobiles, motorcycles, trucks, buses, trains, aircrafts, ships, rockets, construction and farming equipment, military tanks, and the like. Moreover, such devices may also be fossil-fuel burning apparatuses such as power generators, heaters, furnaces, as well as power plants, and the like.

According to a first embodiment of the invention, an apparatus/device operated using a combustion engine, as described herein, may comprise a housing, containing one or more entry ports for a predefined atmospheric air comprising primarily gases of oxygen ($O_2$) and nitrogen ($N_2$). The housing can comprise/enclose an impeller containing a plurality of blades of a predetermined shape around an impeller axis, each blade being extended from the impeller axis to a distal end located on a perimeter of the impeller. Moreover, the impeller being configured, when blades are spinning, to pull the predefined atmospheric air inside the housing through the one or more entry ports, and create a gas gradient to concentrate an oxygen-enriched gas/air near one surface/side of each blade of the plurality of blades, this one surface/side pushing the pulled predefined atmospheric air, as described herein, e.g., see non-limiting examples in FIGS. 3-6.

The housing can further comprise/enclose a plurality of gates placed around the impeller at the distal ends of corresponding blades of the plurality of blades to collect the oxygen-enriched gas/air, the plurality of gates being rotated synchronously with the impeller blades around the impeller axis, the oxygen-enriched gas/air being provided to a combustion chamber of the apparatus for optimizing a combustion process, as described herein, e.g., see non-limiting examples in FIGS. 3-8.

According to the described first embodiment, the apparatus/device may comprise an oxygen content sensor for analyzing oxygen content of the oxygen-enriched gas/air provided by the plurality of gates to provide preliminary tuning for attaining a desired portion of oxygen in the oxygen-enriched gas/air. The preliminary tuning can be implemented using a corresponding small shift of each of the plurality of gates relative to the distal end of corresponding blades of the plurality of blades, while synchronously rotated (see non-limiting examples in FIGS. 1, 7-11). Also the preliminary tuning may be implemented (in addition to or instead of small shifts) by varying a speed of rotation of the impeller blade in a continuous or discrete fashion.

Moreover, the apparatus/device may further comprise one or more exhaust sensors (e.g., one or more of: a temperature sensor, a particulate sensor, a carbon dioxide sensor, an oxygen sensor, a water sensor, a carbon monoxide sensor, a nitrogen oxide sensor and the like) for analyzing a composition of an exhaust gas from the combustion chamber (or combustion spaces) to provide a feedback signal for fine tuning of the oxygen-enriched gas/air entering the plurality of gates in order to meet exhaust standards. The fine tuning can be provided by corresponding small shifts of each of the plurality of gates relative to the distal end of corresponding blades of the plurality of blades while synchronously rotating, as further demonstrated in FIGS. 1 and 3-11. Also the fine tuning may be implemented (in addition to or instead of small shifts) by varying a speed of rotation of the impeller blade in a continuous or discrete fashion.

According to a second embodiment of the invention, the housing can further comprise/enclose at least one plurality of further gates placed around the impeller to collect the nitrogen-enriched gas/air, where each of the further gates can be located between two adjacent blades, the pluralities of gates and further gates being rotated synchronously with the impeller blades around the impeller axis. The nitrogen-enriched gas/air can be used in the apparatus for a) cooling of an engine, a transmission and/or other parts of the apparatus; b) enhancing safety of a fuel tank by filling in the potentially explosive space left by voided fuel; c) improving combustion and/or exhaust performance by adding/circulating the collected nitrogen-enriched gas.

According further to the described second embodiment, the apparatus/device may comprise a nitrogen content sensor for analyzing nitrogen content and/or temperature of the nitrogen-enriched gas/air provided by the plurality of further gates to facilitate nitrogen content tuning, which can be provided by corresponding small shifts of each of the plurality of further gates relative to the corresponding two adjacent blades. In other words, if it is determined that the collected nitrogen-enriched gas does not have a desired portion of nitrogen and/or a desired temperature, the position of the further gates (like gates 261a in FIG. 6) can be adjusted relative to corresponding two adjacent blades by small shifts (similar to adjusting positions of gates relative to corresponding blades by small shifts as shown in FIGS. 7A-7C). Also the nitrogen tuning (content and/or temperature) may be implemented (in addition to or instead of small shifts) by varying a speed of rotation of the impeller blade in a continuous or discrete fashion.

A computer system of the apparatus/device can provide a starting command for spinning of the plurality of blades, gates and further gates, for other sensors and corresponding electronics, according to a predefined algorithm imbedded in the design of the apparatus/device. For example, the starting command may coincide with turning on of the apparatus, so that the oxygen-enriched and/or nitrogen-enriched gases can be provided right away to the corresponding modules. Alternatively, the apparatus may have a separate (primary) start-up system, so that spinning of the gate system and further spinning of the further gate system (secondary system) can start when the apparatus reaches a threshold speed or falls below a threshold speed (see examples presented in FIGS. 1 and 11). In other words, when the apparatus speed goes below the threshold speed or reaches the threshold speed, the primary start-up system can be turned on/turned off respectfully while the secondary system can be completely or partially turned off/turned on respectively. The computer system can comprise logic (application program(s)) to provide logical functionality of start/stop command signals to the appropriate modules of the apparatus/device to control the appropriate order of use.

FIGS. 1-11 demonstrate non-limiting examples of various embodiments of the invention. It is noted that identical or similar parts/elements are designated using the same reference numbers in different figures.

Figure 1:
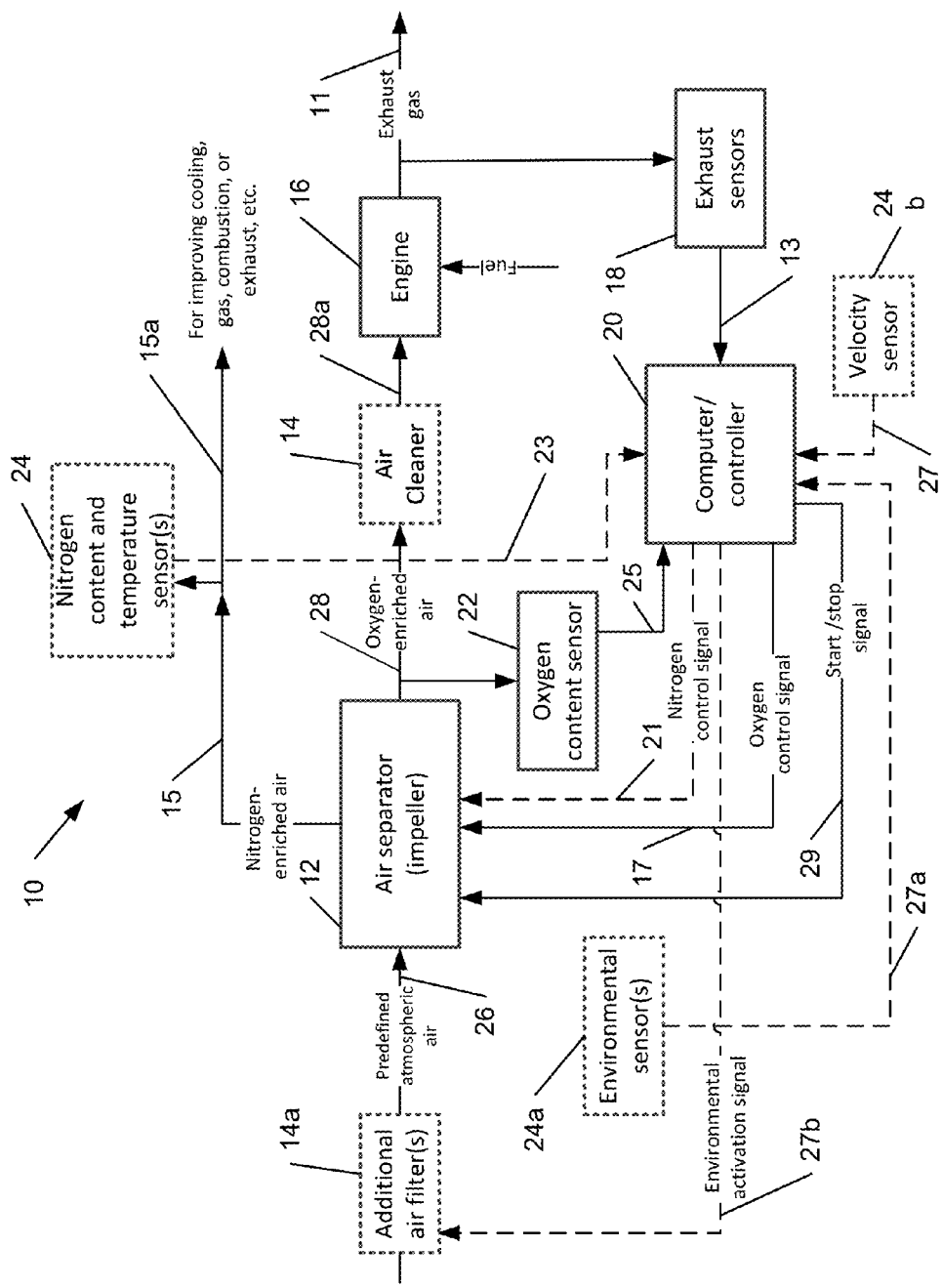
FIG. 1 is an exemplary block diagram of an apparatus/device for continuously providing an oxygen-enriched gas/ air and possibly a nitrogen-enriched gas/air using an impeller-based apparatus, according to various embodiments of the invention.

FIG. 1 is an exemplary block diagram of an apparatus/device 10 for continuously providing an oxygen-enriched gas/air 28 and a nitrogen-enriched gas/air 15 using an impeller-based apparatus/system 12 having a duct system comprising at least one plurality of gates and a further duct system possibly comprising at least one plurality of further gates, respectively, to automatically improve combustion, exhaust and related properties of the apparatus. FIG. 1 is a simplified block diagram of the device 10 that is suitable for practicing the exemplary embodiments of this invention, e.g., in reference to FIGS. 3-11, and a specific manner in which components of the apparatus/device 10 can be configured to cause the device 10 to operate.

A computer/controller 20 (see FIG. 11 for more details) is configured to generate a start/stop signal 29 to turn on and off synchronous spinning impeller blades, gates and further gates, e.g., when the apparatus 10 is turned on/off, or when the apparatus speed crosses a threshold speed, i.e., "on" when the apparatus speed falls below the threshold speed and "off" when the apparatus speed exceeds the threshold speed. Alternatively, for some applications it may be advantageous to generate "on" signal when the apparatus speed exceeds the threshold speed and "off" signal when the apparatus speed falls below the threshold speed.

The apparatus speed can be monitored by a velocity sensor 24b and reported (signal 27) to the computer/controller 20 (see FIG. 1). Then, upon generating the start signal "on", the predefined atmospheric air 26 can be pulled through air entry port(s) of the housing (for example, holes/openings 119 in FIG. 4) in a device/apparatus or a vehicle, (e.g., directly from an atmosphere or provided by a compressor, a turbocharger or the like as a pressurized atmospheric air, as described above).

According to a further embodiment, before providing the generated oxygen-enriched gas/air 28 to an engine 16 for combustion, it can be determined whether the oxygen-enriched gas/air 28 has a desired portion of oxygen, using at least one oxygen-content gas sensor 22. The readout 25 of the sensor 22 can be continuously provided to the computer/controller 20, which can make a determination using an appropriate program application, whether the oxygen-enriched gas/air 28 has the desired oxygen ($O_2$) content. If not, an oxygen control signal 17 can be provided to the impeller 12 for adjusting the content of oxygen using small shift adjustments as further described herein (e.g., like described in detail in reference to FIGS. 7A-7C).

The nitrogen-enriched gas/air 15 can also be monitored to determine whether it has a desired portion of nitrogen, using nitrogen-content gas and/or temperature sensor(s) 24. The readouts 23 of the sensor(s) 24 can be continuously provided to the computer/controller 20, which can make a determination using an appropriate program application, whether the nitrogen-enriched gas/air 15 has the desired nitrogen ($N_2$) content and/or temperature. If not, then a nitrogen control signal may be provided to the impeller system 12 to adjust the content of nitrogen and/or temperature, using small shift adjustments as described herein. Then the nitrogen-enriched gas/air 15*a* with the desired nitrogen ($N_2$) content and/or temperature can be used for various purposes, e.g., for improving cooling of an engine 16, for providing safety of a fuel tank by filling the space left by voided fuel, for optimizing the combustion process and/or improving exhaust performance.

Moreover, after adjusting the oxygen content, the oxygen-enriched gas/air 28 may go through an air cleaner filter 14, so that the cleaned oxygen-enriched gas/air 28*a* can be provided to a combustion chamber (place(s)) of the engine 16 as shown in FIG. 1. It is noted that the air cleaner, which is similar to the air cleaner 14, can be used instead or in addition elsewhere in the system, e.g., before the impeller 12 and/or even before the compressor or turbocharger, if used. It is further noted that environmental sensor(s) 24*a* can provide a further capability to clean the predefined atmospheric air 26, e.g., from excessive water, dust, debris and the like, before it enters the impeller 12. The sensor readout 27*a* can be provided to the computer/controller 20 to generate a corresponding environmental activation signal 27*a* for activating additional air filter(s) 14*a* if necessary.

Furthermore, the engine 16 can facilitate the combustion process, using the cleaned oxygen-enriched gas/air 28*a* and a corresponding fuel, so that an exhaust gas 11 can be further analyzed by exhaust sensors 18. These sensors (which may include one or more of: a temperature sensor, a carbon oxide sensor, a carbon dioxide sensor, an oxygen sensor, a water sensor, a carbon monoxide sensor, a nitrogen oxide sensor and the like) can provide corresponding sensor readings 13 to the computer/controller 20. Then the computer/controller 20 can make a determination, using the appropriate program application(s), whether further adjustment of the oxygen content in the oxygen-enriched gas/air 28*a* and possibly of the nitrogen in the nitrogen-enriched gas/air 15*a* may be necessary. If this is the case, the computer/controller 20 can provide oxygen and nitrogen control signals 17 and 21 respectively to the impeller system 12 for performing necessary adjustments as described herein.

FIG. 2 shows an exemplary view of an impeller 30 (with a base 132) for compressing gases, which is typically used in various devices such as compressors, turbochargers, superchargers, and the like. The impeller 30 comprises a plurality of blades 116 of a chosen (predetermined) shape around a vertical axis 117 of the impeller, each blade being extended from the impeller axis 117 to a distal end 140 on a perimeter of the impeller. As the impeller 30 spins (counter clockwise, as shown), predefined atmospheric air is taken in (at leading edges 121 of impeller blades 116) from above via entry port(s) in the housing (not shown in FIG. 2). The air is forced down the driving/pushing surfaces/sides (130) of the impeller blades 116 and out to an exit port (141), where it is typically collected and driven through ducting to an area, such as a combustion chamber (not shown) at high velocity and high pressure.

A type of impeller shown in FIG. 2 can become a basis for an impeller-based device for providing oxygen-enriched gas/air as well as nitrogen-enriched gas/air, according to an embodiment of the invention, as further discussed herein. For the purpose of this invention, the shape and the size of blades 116 and other components such as entry ports, gates, further gates ducts and the like, can be designed/modified for optimum performance of embodiments described herein.

FIG. 3 is an exemplary three-dimensional view of an impeller system 30*a* with added/identified gates for capturing the oxygen-enriched and nitrogen-enriched gas/air, according to an embodiment of the invention. The principle of operation is based on the fact that during blade spinning (counter clockwise), the oxygen-enriched gas/air can build up on/near the driven/pushing surfaces/sides 130 of the impeller blades 116, whereas lighter molecules of nitrogen ($N_2$) are pushed further away from the pushing surfaces/sides 130 closer to the back surfaces/sides 131 of the blades 116. This can be explained by conservation of momentum, i.e., the heavier molecules of oxygen ($O_2$) pushed by the blade surfaces/sides 130 (with the same force) attain a slower speed than lighter molecules of nitrogen ($N_2$), which leads to a density/mass gradient, so that the oxygen molecules concentrate more near (closer to) the surfaces/sides 130, whereas nitrogen molecules concentrate more away from the surfaces/sides 130 and closer to the back surfaces/sides 131. It is further noted that a speed of rotation of the impeller blades can be varied, thus changing a force applied to the oxygen and nitrogen gas molecules to alter the density/mass gradient distribution. Based on these principles, collection of oxygen-enriched gas/air and nitrogen-enriched gas/air can be implemented as shown in FIG. 3.

An oxygen-enriched gas/air 251 can be collected by gates 252, placed around the impeller at the ends of the blades 140; the gates 252 being rotated synchronously around the impeller axis 117 with the blades 116. Each gate 252 has an open side toward the impeller to accept the oxygen-enriched air (251). Thus, on the driven/pushing blade surfaces/sides 130, the oxygen-enriched gas flows from the exiting ends of the impeller blades 140 into the gates 252 and then into a duct system 253.

A nitrogen-enriched/oxygen-depleted gas/air 260 can be collected by further gates (similar to the gates 252) placed around the impeller somewhere between the two exiting ends of the two adjacent impeller blades 140 and/or closer to the back surfaces/sides 131 and then can be further collected by a separate further duct system (FIGS. 5 and 6 provides more details). All the gates and corresponding ducting spin in sync with the impeller. The gates (separately for oxygen-enriched and nitrogen-enriched gases) can be adjusted slightly clockwise or counter-clockwise relative to the impeller blades, e.g., to provide a desired oxygen portion in the oxygen-enriched gas/air or a desired portion of nitrogen in the nitrogen-enriched gas/air, as described herein.

FIG. 4 is an exemplary three-dimensional view 40 of a housing 118 comprising/enclosing the impeller and gate system for collecting oxygen-enriched and nitrogen-enriches gases, according to various embodiments of the invention. One or more holes/entry ports 119 can be used for entering of the predefined atmospheric air, as described herein. Duct exits 255 and 262 are for providing corresponding oxygen-enriched gas/air 251 and nitrogen-enriched gas/air 260 to the corresponding destinations in the apparatus as described herein.

FIG. 5 is a cross-sectional exemplary view 50 of a housing assembly 40, according to an embodiment of the invention. Impeller blades 116, gates 252, and ducting components 253, 254, 255, 261/261*a* (further gates 261*a* are illustrated in FIG. 6) and 262 are contained within a housing 118. A predefined atmospheric air 26 is pulled through entry ports 119 by vacuum created by the spinning impeller. After passing across the driven/pushing surface 130 of the blade 116, the oxygen-enriched gas/air 251 can pass through the exit gates 252. The gas/air 260 that does not enter the gates 252 can pass into the nitrogen-enriched air gates/ducting 261a/261 (see FIGS. 5 and 6).

The gates 252 can capture a portion of the oxygen-enriched air layer, depending on the adjusted position of the gate entrance relative to the exiting ends of the impeller blades 140. The oxygen-enriched gas/air is then channeled through ducting 253 to a collection chamber 254, which ultimately channels the oxygen-enriched gas/air through a port 255 to the combustion area of the engine 16. The nitrogen-enriched (oxygen-depleted) gas/air can exit through a different port 262 and can be used for various purposes such as improving cooling of the engine 16, providing safety of a fuel tank by filling the space left from the voided fuel, improving the combustion process and/or exhaust, and the like.

It is noted that in the presented examples in FIGS. 3 and 5, there is one gate (251, 252) collecting oxygen-depleted gas per one impeller blade 116. According to a further embodiment of the invention, it could be more than one of such gates per one impeller blade 116, depending on blade design and system design parameters. For example, two gates (e.g., placed vertically one above another in FIG. 5) may be associated with each impeller blade 116. Each of the two gates can be associated with a different ducting system and can be adjusted independently of each other relative to the position of the impeller blade 116 when rotated in sync.

FIG. 6 is an exemplary top, cross-section view 60 of a housing assembly 40 with a removed (virtually cut) housing top portion, according to an embodiment of the invention. Four blades 116 are shown here for this simple illustrative example. However, as stated herein, the plurality of blades can comprise an uneven number of blades for preventing harmonic resonance destruction effects. As each impeller blade rotates/spins, a gas density gradient can form, with reactive oxygen-enriched air 251 being close to the pushing surface 130 of the blade. Then the oxygen-enriched gas/air 251 can move off the blade exit 140 into the gates 252. Then it travels into the ducts 253 below the gates 252 into a collection area 254 and through an exit duct 255 which leads to the combustion area (as shown in FIG. 5 in detail). The nitrogen-enriched (oxygen-depleted) gas/air 260 can be moved away from the blade's pushing surface 130 and can be collected by a further plurality of gates 261a. Alternatively, in the absence of the plurality of further gates 261a, a nitrogen-enriched air 260 can be spanned outward from the impeller base 132 into ducting 261 and exiting through the exit duct 262 (see FIG. 5).

FIGS. 7A-7C are exemplary top views 70a, 70b and 70c, corresponding to various gate 252 positions under different conditions, according to an embodiment of the invention. Two impeller blades are shown in relation to a gate 252, all being rotated in sync. For example, FIG. 7A corresponds to a position of the gate 252 for initial setting (a default position) or after initial adjustment based on the readout of the oxygen content sensor 22 (see FIG. 1) before providing the oxygen-enriched gas/air to the combustion chamber (area). FIGS. 7B and 7C demonstrate the position of the gate 252 after adjustment based on readouts of the exhaust sensors 18 and on the received corresponding oxygen control signal 17 as shown in FIG. 1. Then, if the control signal 17 requires to increase the portion of oxygen, the oxygen content is increased as shown in FIG. 7B, where the gate 252 is shifted a little counter-clockwise to increase/maximize the amount of oxygen-enriched gas collected near the blade surface 130. On the other hand, if the control signal 17 requires to decrease the portion of oxygen, the oxygen content is decreased, as shown in FIG. 7C, where the gate 252 is shifted further counter-clockwise away from the blade surface 130 to diminish the amount of the collected oxygen-enriched gas.

FIGS. 8A-8B are exemplary top views 80a and 80b of various gate 252 positions under different environmental conditions, according to an embodiment of the invention. As discussed in reference to FIG. 1, environmental sensor(s) 24a can help to detect and engage additional air filter(s) 14a to clean the predefined atmospheric air 26 before it enters the air separator (impeller) 12. However, in the absence of environmental sensors 24a and/or additional air filters 14a, or in addition to them, a separate (additional) cleaning of the oxygen-enriched gas/air provided to the combustion chamber/area can be accomplished using corresponding shifting of the gate 252. For example, if the environmental sensor(s) 24a and/or the exhaust sensor(s) 18, may indicate a presence of debris 270 in the predefined atmospheric air 26, an appropriate relative movement of the gate 252, as shown in FIG. 8A, can serve as a barrier to block debris from entering the combustion chamber. In this case, the gate 252 may be essentially "closed" to the oxygen-enriched gas 251 by shifting it clockwise relative to the blades 116 as shown in FIG. 8A, thus avoiding pickup of the debris-laden air by the gate 252, while the oxygen-enriched gas 251 can still flow into the gate 252 due to drag, as shown in FIG. 8A. In addition, in order to avoid entering the nitrogen-enriched gas to the gate 252, the blades 116 may have an additional screening portion 140a, as shown in FIGS. 8A and 8B.

Moreover, if the environmental sensor(s) 24a and/or the exhaust sensors 18 (shown in FIG. 1) indicate an excessive presence of water drops 271 in the predefined atmospheric air 26, an appropriate relative movement of the gate 252 may prevent excessive water drops from entering the combustion chamber. In this case, the gate 252 may be shifted clockwise relative to the blades 116, as shown in FIG. 8A, thus essentially avoiding pickup of the excessive water but allowing the oxygen-enriched air 251 along with some water into the gate 252, while the additional screening portion 140a can prevent the nitrogen-enriched gas entering the gate 252. The remaining water (i.e., excess water) can be eliminated along with the nitrogen-enriched gas/air as shown in FIG. 8B.

FIGS. 9A-9B are exemplary side and top views, 80a and 80b respectively, of an impeller blade with approximated surface nodes 272 on the driven/pushing surface 130 of a blade 116, according to an embodiment of the invention. According to this embodiment, nodes (like small speed bumps, dips, or fins) 272 may be added on the surface 130 to maximize the collection/density of oxygen in the oxygen-enriched air 251 near the surface 130. In addition, the blade 116 can have an internal hollow structure with a wall 131a between the surface/walls 130 and 131 and corresponding openings 259a and 259b at the distal end of the blade 116. The oxygen-enriched gas/air may be collected at gates 252 from the surface 130, as described herein, and/or further using slits/holes 259 in the surface/wall 130 and optionally in the wall 131a to provide additional paths of the oxygen-enriched gas/air 251a and 251b, through the corresponding openings 259a and/or 259b at a distal end of the blade 116, to the exit gates 252, according to a further embodiment. It is further believed that a roughness on the driven/pushing surface 130 of the impeller blade 116 can help to trap the oxygen molecules near the surface 130 and to collect oxygen-enriched gas at the gates 252 more efficiently.

FIG. 10 is an exemplary detailed flowchart for implementation of embodiments, which are disclosed herein. It is noted that the order of steps shown in FIG. 10 is not required, so in principle, the various steps may be performed out of the illustrated order. Also certain steps may be skipped, different steps may be added or substituted, or selected steps or groups of steps may be performed in a separate application, following the embodiments described herein.

In a method according to this exemplary embodiment, as shown in FIG. 10, in a first step 80, a computer/controller (comprising at least one processor and a memory) of an apparatus provides a start signal to spin impeller blades and gates, so that predefined atmospheric air (e.g., from atmosphere, compressor, etc. as defined herein) is pulled to a housing comprising the impeller and the gates, where pluralities of gates and further gates being rotated synchronously with the impeller blades, where gates and further gates are in predefined positions relative to the blades. The start signal may correspond in time to turning the apparatus on, or to a moment a vehicle reaching a threshold speed.

In a next step 82, an oxygen-enriched gas is collected by the plurality of gates at a distal end of the corresponding blades from a pushing surface of the blade. Then in a next step 84, it is determined whether the collected oxygen-enriched gas has the desired portion of oxygen, where the oxygen content/portion is measured by an oxygen-content sensor, as described herein, so that the readout of the measurements is provided to the computer/controller for determination. If it is determined that the collected oxygen-enriched gas does have the desired portion of oxygen, the process can go to step 85. However, if it is determined that the collected oxygen-enriched gas does not have the desired portion/content of oxygen, in a next step 86, location of the gates relative to corresponding blades can be adjusted, e.g., by small shifts, as described in reference to FIGS. 7A-7C. If, for example, in addition to filtering of debris (as discussed in reference to FIG. 1), water contamination may be still required to remove, then the procedure in reference to FIGS. 8A-8B can be used. After the corresponding adjustments, the process can go back to step 82, and steps 82, 84 and 86 are repeated until it is determined in step 84 that the collected oxygen-enriched gas does have the desired portion of oxygen and the process goes to step 85.

In step 85, the collected oxygen-enriched gas is provided to the engine for combustion (combustion chamber or combustion place(s)). In a next step 88, it can be determined whether the exhaust gas is in compliance with exhaust standards, where the exhaust gas parameters are measured by the exhaust sensors, as described herein, so that the readout of the measurement is provided to the computer/controller for determination. If it is determined that the exhaust gas is in compliance with the exhaust standards, the process can go to step 85 to continue a normal operation of the apparatus. However, if it is determined that the exhaust gas is not in compliance with the exhaust standards, in a next step 90, location of the gates relative to corresponding blades can be adjusted by small shifts, as described in reference to FIGS. 7A-7C and 8A-8B. After adjustments, the process can go back to step 85, and steps 85, 88 and 90 are repeated until it is determined in step 88 that the exhaust gas is in compliance with the exhaust standards and the process may go back to step 85.

In step 92, a nitrogen-enriched gas can be collected by the plurality of further gates located between two adjacent blades. Alternatively, as described herein, the nitrogen-enriched gas can be collected directly through a duct. In a next step 94, it can be determined whether the collected nitrogen-enriched gas has a desired portion of nitrogen and/or a desired temperature, so that this nitrogen-enriched gas can be used for a specific goal like cooling of an engine or transmission of the apparatus, providing safety of a fuel tank by filling the space left by voided fuel, or improving combustion and/or exhaust performance. If it is determined in step 94 that the collected nitrogen-enriched gas has a desired portion of nitrogen and/or a desired temperature, the process can go to step 98, where the computer/controller may determine what is an appropriate application of the nitrogen-enriched gas as described herein, so that the nitrogen-enriched gas can be provided in apparatus for possible improvement of cooling, combustion, gas or exhaust, as described herein. It is further noted that in case the nitrogen-enriched gas is collected in step 92 directly through a duct, the process can go from step 94 directly to step 98.

If however, it is determined that the collected nitrogen-enriched gas does not have a desired portion of nitrogen and/or a desired temperature, the process can go to step 96, where the locations of the further gates (like gates 261 in FIG. 6) can be adjusted relative to corresponding blades by small shifts similar to adjusting positions of gates relative to blades by small shifts as shown in FIGS. 7A-7C. After corresponding relative gate position adjustments, the process can go back to step 92 and steps 92, 94 and 96 are repeated until it is determined in step 94 that the collected nitrogen-enriched gas has the desired portion of nitrogen and/or the desired temperature, so that the process can proceed to step 98.

It is further noted, that according to another alternative embodiment described herein, in addition to or instead of using small steps tuning, the adjustment of the desired portion of oxygen in the oxygen-enriched gas/air (steps 86 and 90 in FIG. 10) can be performed by varying a speed of rotation of the impeller blade in a continuous or discrete fashion. Similarly, in addition to or instead of using small steps tuning, the adjustment of the desired portion of nitrogen and/or desired temperature in the nitrogen-enriched gas/air (steps 96 in FIG. 10) can be performed by varying a speed of rotation of the impeller blade in a continuous or discrete fashion.

FIG. 11 is an exemplary block diagram 100 of a computer/controller 20 (shown in FIG. 1) demonstrating its operation within apparatus 10. FIG. 11 is a simplified block diagram of the computer/controller 20 that is suitable for practicing the exemplary embodiments of this invention, e.g., in reference to FIGS. 1 and 3-10, and a specific manner in which components of the computer/controller 20 are configured to cause the device 10 to operate.

The computer/controller 20 may comprise, e.g., at least one processor (controller) 106, and at least one memory 108 including applications 108a such as a start/stop application, a sensor signals evaluation/processing application, control signal application, and the like. The computer/controller 20 may further comprise a transmitter 102 and a receiver 104, which may be configured to transmit and receive signals (wirelessly or using a wired connection). The received signals may comprise any of the signals 25, 13, 23, 27 and 27a from various sensors, as described herein in reference to FIG. 1, so the received signals are provided to corresponding applications 108a. The transmitted signals may comprise processing/command signals generated by the applications 108a, based on the received signals, for implementing various algorithms disclosed herein, such as shown in FIGS. 1 and 3-10. For example, signals 29, 17 and 21 (see FIG. 1) may be directed to corresponding motors/drivers 110, 110a and 110b for providing spinning/rotation and/or relative shifts generated by corresponding applications 108a to the impeller blades, gates and further gates respectively, as described herein, as well as other control signals such as the environmental activation signal 27b to the additional air filter 14a and the like (see FIG. 1). The transmitter 102 and the receiver 104 may be generally means for transmitting/receiving and may be implemented as a transceiver, or a structural equivalent thereof.

Various embodiments for the at least one memory 108 (e.g., computer readable memory) may include any data storage technology type which is suitable to the local technical environment, including but not limited to: semiconductor based memory devices, magnetic memory devices and systems, optical memory devices and systems, fixed memory, removable memory, disc memory, flash memory, DRAM, SRAM, EEPROM and the like. Various embodiments of the processor 106 include but are not limited to: general purpose computers, special purpose computers, microprocessors, digital signal processors (DSPs), multi-core processors, embedded, and System on Chip (SoC) devices.

The application module 108a may be implemented as one or more application computer programs stored in the memory 108, but in general it may be implemented as software, firmware and/or a hardware module, or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor.

According to further embodiments of the invention, the impeller system described herein can be manufactured with processes that are currently used to manufacture superchargers, turbo-chargers, and compressors. For example, the casing can be molded through processes such as metal casting, plaster of Paris molding, injection molding, lost wax casting or the like. The exit tubes, metal, ceramic or organic, can be injection-molded in a variety of materials, including rubbers, non-reactive, high temperature plastic tubes, or other synthetic materials. All exit components may use coatings or be coated with nitrogen rich coatings preventing oxidative reactions.

Moreover, the continuous oxygen enriching can result in more rapid firing and higher burn efficiency. The oxygen mix can be controlled so as not to deteriorate engine components. To take full advantage of the oxygen-enriched air, certain engine components may have to be made of materials such as ceramic materials, which can withstand high temperatures.

Furthermore, in comparison to engines that use normal or compressed air, continuous oxygen air enrichers may enable engines to burn any fossil fuels at accelerated rate, on demand, in order to: produce greater power and accelerated burn rate, and produce equivalent results with less fuel. The continuous oxygen enricher can enable vehicle manufacturers and owners to: increase engine performance, even for existing vehicles; reduce future engine size and weight; increase fuel efficiency and mileage; and reduce emissions of carbon monoxide and unburned carbon.

The potential use of the novel technology described herein may include (but may not be limited to) the following:

Any motor vehicle that runs on land, water, or rails that has an engine that burns fossil fuel, benefits: increased power, fuel efficiency, and lower emissions of carbon monoxide, and particulate matter;

Aircraft, including those driven with jet engines, helicopter engines, propeller engines, turboprops, or rocket engines, benefits: increased power, fuel efficiency, and lower emissions of carbon monoxide, and particulate matter, shorter and quicker takeoffs with shorter runways, ability to fly higher;

Furnaces, including those used for building and home heating, generating power, and manufacturing, benefits: increased fuel efficiency, lower emissions of carbon monoxide, and particulate matter;

Hospitals and medical facilities: ability to continuously generate oxygen-enriched air from a central source to patient rooms, operating rooms, emergency rooms, etc.;

Respiratory treatment: portable enriched oxygen generators that replace oxygen tanks;

Scuba systems: enriched oxygen can lead to longer dive times with equipment that normally contains atmospheric air;

Fuel combustion safety: enriched oxygen can lead to the use of fuels that only burn in enriched oxygen environments; these fuels would not ignite or explode in regular atmospheric air, for instance, during automobile or plane crashes or during plane fuel leaks or service station fuel leaks;

Fire control: in order to extinguish underground mine fires, nitrogen-enriched air could be pumped into underground spaces, while collecting methane for profit; and Fuel tank safety: another possible use would be to backfill fuel tanks during flight/ride/use with nitrogen-enriched air that will reduce tendency to burn/ignite.

Methane clearing and collection: infusion of underground spaces such as mines and sewage treatment plants with nitrogen-enriched air could flush out methane to be collected at exit points and recollect the nitrogen for reuse.

More specific benefits/advantages for using a nitrogen-enriched gas/air may include (but are not limited to) the following:

Reduced temperature and significantly reduced reactivity of the nitrogen-enriched gas compared to normal atmospheric air is due to the reduced oxygen content;

Reduced oxidization reactivity of the nitrogen-enriched gas compared to the normal atmospheric air is due to the increased nitrogen barriers interfering with oxidation;

Based on excessive energy input necessary to make nitrogen to react with any element like silicon, iron, aluminum, and titanium, it follows that nitrogen-enriched cooling gas will be significantly less reactive than atmospheric air.

Unless defined otherwise, technical and scientific terms used herein have the same meaning as is commonly understood by one having ordinary skill in the art to which this disclosure belongs. The terms "first", "second", and the like, as used herein, do not denote any order, quantity, or importance, but rather are employed to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof, as well as additional items. The terms "connected" and "coupled" are not restricted to physical or mechanical connections or couplings, and can include electrical and optical connections or couplings, whether direct or indirect.

Furthermore, the skilled artisan will recognize the interchangeability of various features from different embodiments. The various features described, as well as other known equivalents for each feature, can be mixed and matched by one of ordinary skill in this art, to construct additional systems and techniques in accordance with principles of this disclosure.

In describing alternate embodiments of the apparatus claimed, specific terminology is employed for the sake of clarity. The invention, however, is not intended to be limited to the specific terminology so selected. Thus, it is to be understood that each specific element includes all technical equivalents that operate in a similar manner to accomplish similar functions.

It is to be understood that the foregoing description is intended to illustrate and not to limit the scope of the invention, which is defined by the scope of the appended claims. Other embodiments are within the scope of the following claims.

It is noted that various non-limiting embodiments described and claimed herein may be used separately, combined or selectively combined for specific applications.

Further, some of the various features of the above non-limiting embodiments may be used to advantage, without the corresponding use of other described features. The foregoing description should therefore be considered as merely illustrative of the principles, teachings and exemplary embodiments of this invention, and not in limitation thereof.

What is claimed is:

1. An apparatus, comprising:
a housing, comprising one or more entry ports for inletting a predefined atmospheric air comprising gases of oxygen (O2) and nitrogen (N2), the housing further comprising:
an impeller comprising a plurality of blades of a predetermined shape around an impeller axis, each blade being extended from the impeller axis to a distal end on a perimeter of the impeller, the impeller being configured, when blades are spinning, to pull the predefined atmospheric air inside the housing through the one or more entry ports, and create a gas gradient to concentrate an oxygen-enriched gas/air of the predefined atmospheric air near at least one surface of each blade of the plurality of blades, said one surface pushing the pulled predefined atmospheric air; and
a plurality of gates placed around the impeller at the distal ends of corresponding blades of the plurality of blades to collect the oxygen-enriched gas/air, the plurality of gates being rotated synchronously with the blades of impeller around the impeller axis, the oxygen-enriched gas/air being provided to a combustion chamber of the apparatus for optimizing a combustion process.

2. The apparatus of claim 1, wherein the apparatus comprises a vehicle driven by an engine comprising the combustion chamber or one or more combustion chambers/spaces.

3. The apparatus of claim 1, wherein the apparatus comprises a fossil-fuel burning vehicle containing an automobile, a motorcycle, a truck, an aircraft, a ship, a bus or a rocket, or a fossil-fuel burning apparatus containing a power generator, a power plant, a heater or a furnace.

4. The apparatus of claim 1, wherein the predefined atmospheric air is provided: directly from an atmosphere, by a further impeller, or by a fan-driven device comprising a compressor, supercharger or a turbocharger.

5. The apparatus of claim 1, wherein the pushing surfaces of the plurality of blades comprise a plurality of surface nodes implemented as bumps, dips or fins to increase a portion of oxygen near the pushing surfaces.

6. The apparatus of claim 1, wherein the corresponding blades of the plurality of blades comprise holes on the pushing surface and on the distal end of the blade to increase collection efficiency of oxygen in the collected oxygen-enriched gas.

7. The apparatus of claim 1, further comprising an engine comprising the combustion chamber and one or more exhaust sensors analyzing a composition of an exhaust gas from the combustion chamber for providing a feedback signal for fine tuning of the oxygen-enriched gas/air entering the plurality of gates in order to meet exhaust standards, the fine tuning is provided by one or more of: a) varying a rotation velocity of the pluralities of blades and gates, and b) a corresponding small shift of each of the plurality of gates relative to the distal end of the corresponding blades of the plurality of blades while synchronously rotated.

8. The apparatus of claim 7, wherein the one or more exhaust sensors comprise one or more of: a temperature sensor, a particulate sensor, a carbon oxide sensor, a carbon dioxide sensor, an oxygen sensor, a water sensor, a carbon monoxide sensor, and a nitrogen oxide sensor.

9. The apparatus of claim 1, further comprising: a plurality of further gates placed around the impeller to collect the nitrogen-enriched gas/air, each of the further gates is located between two adjacent blades, the pluralities of gates and further gates being rotated synchronously with the blades of impeller around the impeller axis.

10. The apparatus of claim 9, wherein the nitrogen-enriched gas/air is used in the apparatus for cooling of an engine or transmission of the apparatus, for safety of a fuel tank, or for improving combustion or exhaust performance.

11. The apparatus of claim 9, further comprising a nitrogen sensor for analyzing one or both, nitrogen content and temperature, of the nitrogen-enriched gas/air, provided to facilitate tuning of one or both a desired nitrogen content and a desired temperature, which is provided by one or more of: a) varying a rotation velocity of the pluralities of blade, gates and further gates, and b) a corresponding small shift of each of the plurality of further gates relative to the corresponding two adjacent blades.

12. The apparatus of claim 1, further comprising an oxygen-content gas sensor for analyzing oxygen content of the oxygen-enriched gas/air provided by the plurality of gates to provide preliminary tuning of a desired portion of oxygen in the oxygen-enriched gas/air, the preliminary tuning is provided by one or more of: a) varying a rotation velocity of the pluralities of blades and gates, and b) a corresponding small shift of each of the plurality of gates relative to the distal end of the corresponding blades of the plurality of blades while synchronously rotated.

13. The apparatus of claim 1, wherein the plurality of blades comprise an uneven number of blades for harmonic resonance prevention and control.

14. A method, comprising:
spinning a plurality of blades having a predetermined shape of impeller around an impeller axis of an apparatus and pulling a predefined atmospheric air comprising gases of oxygen ($O_2$) and nitrogen ($N_2$), each blade being extended from the impeller axis to a distal end on a perimeter of the impeller, to create a gas gradient to concentrate an oxygen-enriched gas/air of the predefined atmospheric air near at least one surface of each blade of the plurality of blades, said one surface pushing the pulled predefined atmospheric air; and further spinning a plurality of gates placed around the impeller at the distal ends of corresponding blades of the plurality of blades for collecting the oxygen-enriched gas/air, the plurality of gates being rotated synchronously with the blades of impeller around the impeller axis; and providing the collected oxygen-enriched gas/air to a combustion chamber of the apparatus for optimizing a combustion process, wherein a housing, comprising one or more entry ports for inletting the predefined atmospheric air comprising $O_2$ and $N_2$, contains said impeller and said plurality of gates.

15. The method of claim 14, wherein the spinning and the further spinning start when the apparatus falls below or exceed a threshold speed.

16. The method of claim 14, further comprising:
determining whether the exhaust gas of the combustion process is in compliance with exhaust standards, using a plurality of one or more exhaust sensors analyzing a composition of the exhaust gas; and
providing a feedback signal for fine tuning of the oxygen enriched gas/air entering the plurality of gates in order to meet the exhaust standards, the fine tuning is provided by one or more of: a) varying a rotation velocity of the pluralities of blades and gates, and b) a corresponding small shift of each of the plurality of gates relative to the distal end of corresponding blades of the plurality of blades while synchronously rotated.

17. The method of claim 14, before providing the collected oxygen-enriched gas/air to a combustion chamber of the apparatus for a combustion process, further comprising:
determining whether the collected oxygen-enriched gas/air has a desired portion of oxygen, using at least one oxygen-content gas sensor; and
providing a feedback signal for preliminary tuning of the desired portion of oxygen in the oxygen-enriched gas/air, the preliminary tuning being provided by one or more of: a) varying a rotation velocity of the pluralities of blades and gates, and b) a corresponding small shift of each of the plurality of gates relative to the distal end of the corresponding blades of the plurality of blades while synchronously rotated.

18. The method of claim 17, further comprising:
further spinning a plurality of further gates placed around the impeller to collect the nitrogen-enriched gas/air, each of the further gated being located between two adjacent blades, the pluralities of further gates being rotated synchronously with the blades of impeller around the impeller axis.

19. The method of claim 17, further comprising:
using the nitrogen-enriched gas/air in the apparatus for cooling of an engine of the apparatus, for reducing explosivity of a fuel tank, or for improving combustion or exhaust performance.

20. The method of claim 17, further comprising:
determining whether the collected nitrogen-enriched gas/air has one or both, a desired portion of nitrogen and a desired temperature, using at least one nitrogen-content gas sensor; and providing a feedback signal for nitrogen tuning to facilitate one or both, the desired portion of nitrogen and the desired temperature, in the nitrogen-enriched gas/air, by one or more of: a) varying a rotation velocity of the pluralities of blades and gates, and b) a corresponding small shift of each of the plurality of further gates relative to the corresponding two adjacent blades.

21. A non-transitory computer readable storage medium tangibly storing computer program instructions capable of being executed by a computer processor, the computer program instructions defining code for:
spinning a plurality of blades having a predetermined shape of impeller around an impeller axis of an apparatus and pulling a predefined atmospheric air comprising gases of oxygen (O2) and nitrogen (N2), each blade being extended from the impeller axis to a distal end on a perimeter of the impeller, to create a gas gradient to concentrate an oxygen-enriched gas/air of the predefined atmospheric air near at least one surface of each blade of the plurality of blades, said one surface pushing the pulled predefined atmospheric air;
further spinning a plurality of gates placed around the impeller at the distal ends of corresponding blades of the plurality of blades for collecting the oxygen-enriched gas/air, the plurality of gates being rotated synchronously with the blades of impeller around the impeller axis; and
providing the collected oxygen-enriched gas/air to a combustion chamber of the apparatus for optimizing a combustion process.

22. The non-transitory computer readable storage medium of claim 21, wherein the computer program instructions further defining code for:
determining whether the exhaust gas of the combustion process is in compliance with exhaust standards using a plurality of one or more exhaust sensors analyzing a composition of the exhaust gas; and
providing a feedback signal for fine tuning of the oxygen-enriched gas/air entering the plurality of gates in order to meet the exhaust standards, the fine tuning is provided by one or more of: a) varying a rotation velocity of the pluralities of blades and gates, and b) a corresponding small shift of each of the plurality of gates relative to the distal end of the corresponding blades of the plurality of blades while synchronously rotated.

23. The non-transitory computer readable storage medium of claim 21, wherein the computer program instructions further defining code for:
determining whether the collected oxygen-enriched gas/air has a desired portion of oxygen, using at least one oxygen-content gas sensor; and
providing a feedback signal for preliminary tuning of the desired portion of oxygen in the oxygen-enriched gas/air, the preliminary tuning being provided by one or more of: a) varying a rotation velocity of the pluralities of blades and gates, and b) a corresponding small shift of each of the plurality of gates relative to the distal end of the corresponding blades of the plurality of blades while synchronously rotated.

* * * * *